United States Patent
Lynn

(10) Patent No.: US 7,531,046 B2
(45) Date of Patent: May 12, 2009

(54) PROCESS FOR DE-OILING STEELMAKING SLUDGES AND WASTEWATER STREAMS

(75) Inventor: John D. Lynn, Center Valley, PA (US)

(73) Assignee: Recovery Technology LP, Pottsville, PA (US)

( * ) Notice: Subject to any disclaimer, the term of this patent is extended or adjusted under 35 U.S.C. 154(b) by 370 days.

(21) Appl. No.: 11/016,136

(22) Filed: Dec. 17, 2004

(65) Prior Publication Data
US 2006/0130611 A1     Jun. 22, 2006

(51) Int. Cl.
*B08B 5/04* (2006.01)
(52) U.S. Cl. .......................... 134/21; 159/47.1; 75/316
(58) Field of Classification Search ................. 75/316, 75/711; 159/47.1; 134/21
See application file for complete search history.

(56) References Cited

U.S. PATENT DOCUMENTS

| | | |
|---|---|---|
| 3,755,136 A | 8/1973 | Fields et al. |
| 4,518,458 A * | 5/1985 | Greenfield et al. ......... 159/47.1 |
| 4,839,151 A * | 6/1989 | Apffel ..................... 423/449.7 |
| 4,995,912 A | 2/1991 | Goss et al. |
| 5,047,083 A | 9/1991 | Blake et al. |
| 5,554,298 A | 9/1996 | Kochik et al. |
| 6,406,550 B1 | 6/2002 | Feldbauer et al. |

OTHER PUBLICATIONS

Environmental Chemical Corporation: www.ecc.net Setting the Standard in Innovative Remediation copyright 2003.

* cited by examiner

*Primary Examiner*—George Wyszomierski
*Assistant Examiner*—Weiping Zhu
(74) *Attorney, Agent, or Firm*—Harold I. Masteller, Jr.

(57) ABSTRACT

The present invention is directed to a process for treating an oily mixture consisting of hydrocarbons, solid particles, and water. The steps of the process include placing the oily mixture into a reactor chamber, purging the reactor chamber with an inert gas, and creating a steam bath within the inert gas filled reactor chamber, the steam surge freeing hydrocarbon matter from the solid particles. The process further includes elevating reactor chamber temperature to a boiling point temperature corresponding to the hydrocarbons in the oily mixture, the elevated temperature vaporizing the hydrocarbons are vaporized within inert atmosphere. The reaction chamber is vented and the off-gas is processed into a hydrocarbon product while the de-oiled solid particles are discharged from the reaction chamber as a raw material or for disposal.

32 Claims, 4 Drawing Sheets

US 7,531,046 B2

PROCESS FOR DE-OILING STEELMAKING SLUDGES AND WASTEWATER STREAMS

FIELD OF THE INVENTION

The present invention is directed to a process for treating oily materials such as wastewater treatment sludge in manufacturing, and municipal operations, and in particular, this invention is directed to de-oiling iron-bearing solid particles contained in an oily sludge or wastewater stream generated in a steelmaking or other metallurgical refining operation. More specifically, this invention is directed to, but not limited to, de-oiling iron oxide scale stripped from hot steel products during rolling mill operations in a steelmaking plant. In such rolling mill operations, iron-bearing particles are entrained within the mill sludge collected in a waste stream reservoir called a scale pit located below the rolling mill stands. The oils and greases (hydrocarbons) used as coolants and lubricants during the rolling operation adhere to the collected mill scale making the sludge difficult to handle, and the high hydrocarbon content of the sludge makes it impossible to recycle the valuable iron oxides back into the steelmaking operation without first treating the sludge to remove the oils and greases.

SUMMARY OF THE INVENTION

Accordingly, it is a first object of the present invention to provide an environmentally low impact process for de-oiling iron-bearing solid particles contained in steelmaking sludge, oily wastewater streams, and the like.

It is another object of the present invention to provide a de-oiling process that recovers valuable hydrocarbon products from oily steelmaking sludge, wastewater streams, and the like.

Another object of the present invention is to provide a de-oiling process that recovers dry de-oiled solid particles that are suitable for recycling as a revert back into a steelmaking or other metallurgical manufacturing operation.

A still further object of the invention is to provide a de-oiling process that eliminates undesirable emissions during the steps of the de-oiling process.

Yet another object of the present invention is to provide a de-oiling process that produces a dry de-oiled solid waste material that is suitable for landfill disposal.

Other objects and advantages of the present invention will become apparent as a description thereof proceeds.

In satisfaction of the foregoing objects and advantages, the present invention treats oily mixtures in a reactor chamber purged with an inert gas. The reactor chamber temperature is raised so that water in the mixture creates a steam surge that erupts through the oily mixture. The erupting steam surge dehydrates the oily mixture and removes or frees any viscid hydrocarbons that adhere to surfaces of solid particles contained in the oily mixture. The temperature within the inert gas filled reactor chamber is further elevated to vaporize the hydrocarbons, and the inert gas, steam and hydrocarbon vapors are vented as an off-gas from the reaction chamber. The vented off-gas is separated into inert gas recycled back into the process, water, and at least one hydrocarbon product. The remaining, de-oiled solid particles are discharged from the reactor chamber for downstream processing into valuable raw materials or disposal.

BRIEF DESCRIPTION OF THE DRAWINGS

FIG. 1 is a flow diagram showing the preferred process for de-oiling an oily sludge or wastewater stream generated at a manufacturing operation and the like.

DESCRIPTION OF THE PREFERRED EMBODIMENTS OF THE INVENTION

Many manufacturing, municipal operations, and environmental accidents such as oil spills generate oil-bearing waste materials that are difficult to dispose of and/or cleanup in view of EPA regulations. It is becoming more difficult to landfill such oily waste materials because of our increased concern for environmental impact when oils and greases leach into the surrounding ground and water tables. The present invention offers significant improvements in the art of de-oiling such sludges and wastewater streams. The preferred embodiments of the present invention provide a new and improved de-oiling process that recovers valuable hydrocarbon products and solids from manufacturing, and municipal sludges, oily wastewater streams. The present de-oiling process invention is also effective for cleanup at beaches and land areas impacted by oil spills.

Figure 1:
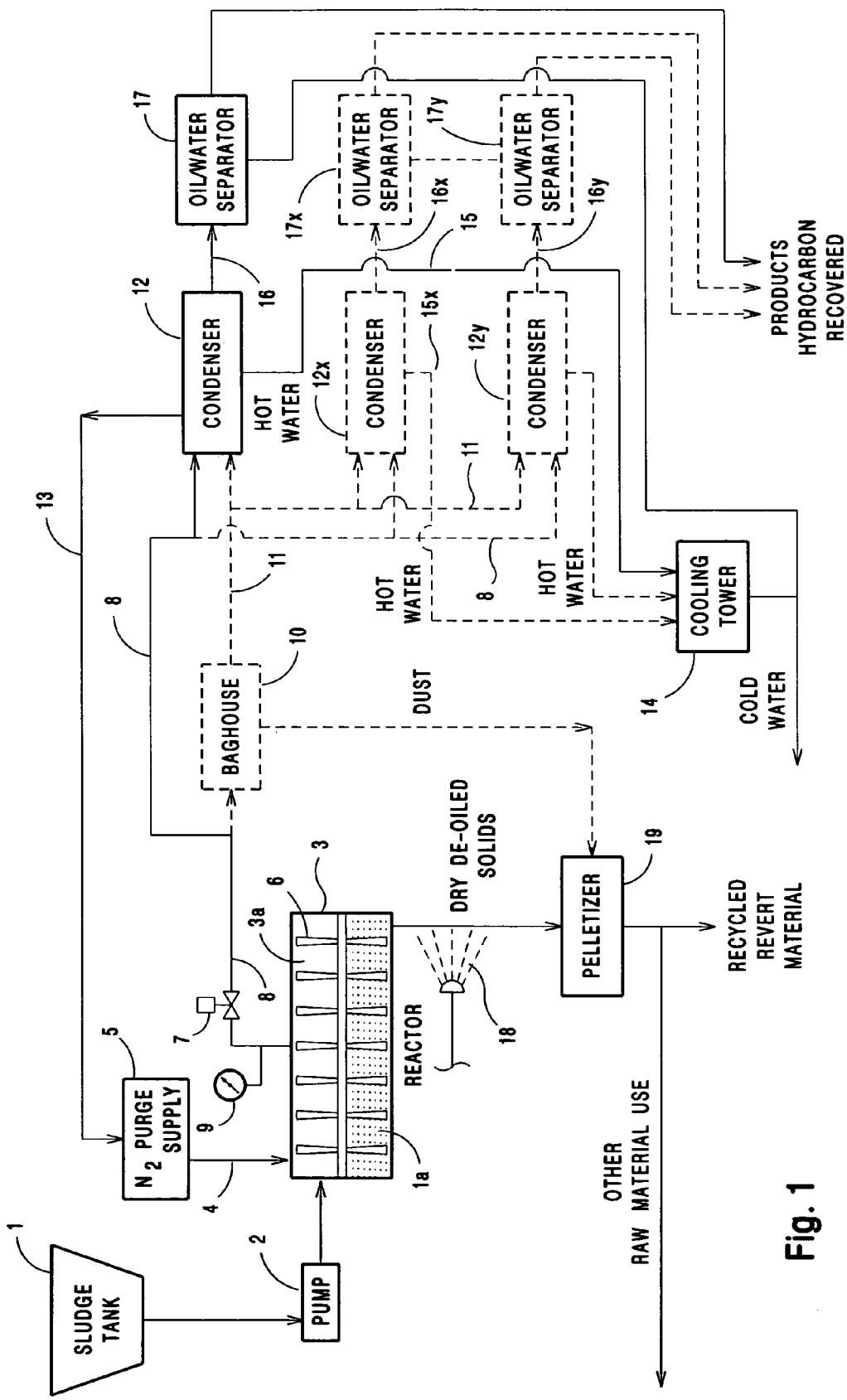

Referring to FIG. 1, the preferred embodiment is directed to recovering iron-bearing solid particles and hydrocarbon products contained in sludge at a steelmaking rolling mill operation. Rolling mill sludge is an oily waste material that contains iron oxides in an amount of between about 30-95% by weight. It is well known within the art that such iron oxides are valuable revert materials if recycled back into the steelmaking operation.

Various other iron-bearing oily wastewater streams are generated throughout an integrated steelmaking plant. Such oily waste materials are generated at a rate of about 2% of the plant's steelmaking capacity. Therefore, if the iron-bearing waste streams can be recycled back into the manufacturing operation as a revert material, the entrained iron oxides will provide a substantial reduction in raw material costs. However, rolling mill sludge, and the like, has a high moisture content that makes the sludge very difficult to handle in a recycling stream. The oils and greases that adhere to finely sized solid particles in the sludge present safety and environmental concerns. For example, a typical composition limit for safely recycling oily iron-bearing solids back into a steelmaking vessel is about 0.5% hydrocarbon material by weight or 5,000 ppm. Sludge containing oils and greases in amounts greater than 5,000 ppm may cause an explosion when they are fed into a hot steelmaking vessel. Such hydrocarbon limits also apply to non-steelmaking smelting and refining operations.

Furthermore, high hydrocarbon concentrations in an oily waste material will generate volatile organic compound (VOC) emission levels that are unacceptable by EPA standards. Under current EPA standards, an acceptable limit for recycled oily steelmaking sludge and the like is 0.25% by weight or 2,500 ppm and lower. This hydrocarbon limit prevents unacceptable levels in VOC emissions. It is not unreasonable to expect that in the future, the EPA will enact even more stringent hydrocarbon restrictions for recycled oily waste materials.

Typical wastewater streams generated throughout a steelmaking operation contain hydrocarbons in an amount of between about 2% to about 15% by weight or 20,000 to about 150,000 ppm. This makes such sludge and wastewaters unsuitable for recycling back into the steelmaking operation. Accordingly, if steelmaking sludge cannot be recycled back into the manufacturing operation, the sludge must be carefully disposed in a landfill to meet the required EPA paint filter test. Such landfill operations are costly and labor intensive. Even when oily sludge is properly disposed of, there is a continuing risk of groundwater contamination. There is also a possibility that VOC emissions will evolve at the landfill site. The requirements set forth by federal and state regulatory agencies regarding oily sludge disposal continue to become more stringent with the ultimate goal being environmental protection. Accordingly, landfill and land application costs continue to escalate. The increasing emphasis on environmental issues, along with quality processing and economic concerns, has prompted a search for suitable treatment options for oily waste materials.

Referring again to FIG. 1, iron-bearing mill scale and wastewater sludge is contained in a sludge tank 1. Such sludge comprises a mixture of iron-bearing solid particles (iron oxides) in amounts between about 30% to about 95% by weight or 300,000 to about 950,000 ppm, hydrocarbons in amounts between about 2% to about 15% by weight or 50,000 to about 150,000 ppm, and the balance water in an amount that can range between about 10% to 80% by weight depending on the iron and oil concentrations in the mixture. Before the sludge is de-oiled, it is analyzed to determine the specific type or types of hydrocarbons contained therein and the respective boiling point temperatures. An exemplary pump 2 feeds the sludge mixture into a reactor vessel 3 where the sludge will be treated to separate the water and hydrocarbons from the solid components in the mixture, in this instance the solid iron oxide particles. Any suitable means may be used to feed the oily mixture into the reactor vessel without departing from the scope of this invention.

In the preferred embodiment of the present invention, showing an exemplary batch de-oiling process, after a predetermined amount of iron-bearing sludge 1a is pumped from tank 1 into the reactor vessel 3, the reactor vessel is sealed. A hot inert gas purge is fed into sealed reactor vessel 3 by way of line 4 that extends from an inert gas supply 5. In this example, the inert gas is nitrogen heated to about the boiling point temperature of a particular hydrocarbon contained in the sludge is fed into the sealed reactor vessel. However, it should be understood that any heated inert gas, such as nitrogen, argon, etc. may be used as a purge without departing from the scope of the present invention.

Reactor vessel 3 includes a stirring mechanism 6 housed within its sealed interior chamber 3a. The stirring mechanism 6 is operated during at least part of the heating cycle to expose each surface of the finely sized solid particles in sludge mixture 1a. In this example, the finely sized particles measure about 100 mesh or smaller. As heretofore mentioned above, the sludge mixture 1a is analyzed to determine the specific type or types of hydrocarbons contained in the oily mixture and to determine the boiling point temperatures thereof. Initially, the temperature within chamber 3a is raised to 200-250° F. (93-121° C.) so that the water contained in the oily sludge mixture is vaporized. This creates a steam surge that erupts through the mixture and removes or frees the hydrocarbons clinging to the surfaces of the finely sized solid particles. The temperature within the sealed chamber is elevated toward a maximum boiling point temperature (target temperature) determined for the hydrocarbons contained in the sludge, for example 800°-1000° F. (427°-538° C.), and the freed hydrocarbons, as well as the suspended hydrocarbons in the mixture, are vaporized. During the heating cycle, the nitrogen gas purge provides an inert gas atmosphere that prevents ignition of the gases evolved from the heated hydrocarbons.

Referring specifically to iron-bearing mill stand sludge, such oily mixtures contain about 5% oil and/or grease (hydrocarbons) by weight or about 50,000 ppm, about 25% solids by weight or 250,000 ppm, and the balance water. As described above, the oily mixture is stirred and de-oiled within the sealed interior chamber 3a. As temperature within sealed chamber 3a is raised to about 212° F. (100° C.), an erupting steam surge is generated. The steam surge erupts from the oily mixture and it removes or frees any hydrocarbons clinging to the solid particles and dehydrates the mixture. During this initial phase of the heating cycle, a small amount of hydrocarbons may vaporize and the hydrocarbon concentration in the mixture 1a may actually increase slightly as the water is converted to steam. When the water concentration falls to near zero, the chamber temperature begins to rise through a range of one or more effective temperature levels to a target temperature and one or more hydrocarbons are vaporized within the sealed chamber by the increasing temperature. When the sealed chamber temperature reaches the target temperature, the hydrocarbon concentration in the mixture falls to about 0.01 to 0.04% by weight or 100 to 400 ppm, leaving behind a valuable de-oiled and de-watered iron-bearing revert material. The hydrocarbon concentration of the solids de-oiled by the steps of the present invention is well below the EPA standards for recycling revert material back into the steelmaking process. Accordingly, the steps of the present invention can effectively de-oil a mixture having a hydrocarbon concentration of about 0.05% by weight (500 ppm) or higher. However, considering typical steelmaking sludge concentrations in combination with the EPA standards, a preferred mixture de-oiled by the present invention would have a hydrocarbon concentration of about 0.25% by weight (2,500 ppm) or higher, and a more preferred oily mixture would have a hydrocarbon concentration of about 2% by weight (20,000 ppm) or higher.

Referring again to FIG. 1, during the initial heating step of the de-oiling process, when it is determined that the steam surge has removed or freed the hydrocarbons clinging to the finely sized solid particles, valve 7 is operated to open sealed chamber 3a. The opened valve purges the hot gases from the vessel, for example, nitrogen, hydrocarbon vapors, and steam, as a hot off-gas discharged through gas line 8 attached to reactor vessel 3. Such gas purge determination may be made by operating valve 7 in response to a pressure or a temperature measurement within sealed chamber 3a. A continuous emissions monitor (CEM) 9 samples the off-gas. When the monitor shows the amount of hydrocarbon vapor in the off-gas suddenly falls to virtually zero, the de-oiling process is discontinued. Chamber 3a is purged with hot nitrogen gas to prevent a premature phase change before the off-gas reaches condenser 12. The remaining dry de-oiled solids are discharged from reactor vessel 3 for downstream processing and use.

In some instances, where the off-gas contains suspended particulate matter, it may be desirable to feed the off-gas through an optional baghouse 10, shown in dotted lines, before the hot off-gas is sent to the condenser 12. Such baghouse apparatus may comprise any suitable filter arrangement well known in the art without departing from the scope of the present invention. For example, the baghouse may include an arrangement of mechanical filters, an electrostatic precipitator system, or other suitable means. However, in instances where the de-oiling process does not produce suspended particulate matter in the off-gas discharge the hot gas does not need to be cleaned in a baghouse. In such operations, the hot off-gas is fed directly from reactor vessel 3 to condenser 12.

The hot gases are fed downstream through gas line 11 to condenser 12 where the gas is separated into nitrogen recycled back to the inert gas purge supply 5 through return line 13 for reuse in the de-oiling process, into hot water that is discharged to a cooling tower 14 through line 15, and into a condensate that is fed along line 16 to separator 17 that isolates condensate substances into water and hydrocarbon products using any suitable means well known in the art. The waters discharged from separator 17 and cooling tower 14 are suitable for direct discharge to the environment.

EXAMPLE 1

In the event oily mixture 1a comprises certain amounts of finely sized solids, water, and a particular single hydrocarbon, for example a light, a single heating cycle raises the chamber temperature through a temperature range that includes the steam surge temperature and a target temperature suitable for vaporizing the single hydrocarbon, in this instance 550° F. (288° C.) for the light oil. As the chamber temperature is elevated from ambient temperature to the target temperature, the above-mentioned steam surge removes any oil clinging to the solid particle surfaces. As the temperature approaches target temperature, the light oil begins to vaporize, and complete vaporization of the oil is realized at target temperature. The heating cycle is discontinued when the OEM 9 indicates that there are no hydrocarbon vapors evolving from the heated mixture. The reactor vessel 3 is then purged with hot nitrogen gas from supply 5, and the condensate from condenser 12 is fed along line 16 to a separator 17 where the condensate is separated into water and light oil hydrocarbon product.

EXAMPLE 2

When oily mixture 1a is, for example HMS sludge, comprising certain amounts of solids, water, and two or more particular hydrocarbons, i.e. light oil and grease from rolling mill stands, the de-oiling process includes a first and a second heating cycle. The first heating cycle includes the temperature that generates the steam surge within the oily mixture to free sticky or viscid hydrocarbons from the solid particle surfaces, and a lowest, or first, effective temperature for vaporizing one of the hydrocarbons contained in the oily mixture. In this instance, the first effective temperature is an exemplary 550° F. (288° C.), the boiling point temperature for the light oil. The off-gas is fed to condenser 12, and the condensate is fed along line 16 to a separator 17 where it is separated into water and a light oil or first hydrocarbon product. When the CEM 9 indicates an absence of hydrocarbon vapors in the off-gas, chamber 3a is purged with hot nitrogen gas to remove any remaining oil vapors.

The process continues with the second or next successive heating cycle that raises the chamber temperature to the next higher effective temperature corresponding with a boiling point temperature for one of the hydrocarbons contained in the oily mixture, in this instance the grease having an exemplary boiling point temperature of about 1050° f. (566° C.). During the second heating cycle, off-gas from reactor vessel 3 may be fed either along lines 8 or 11 to an optional or second condenser 12x. In such an alternate embodiment, condensate from the second condenser 12x is fed along line 16x to a second separator 17x where the condensate is separated into water and a grease or last hydrocarbon product. When the CEM 9 indicates an absence of hydrocarbon vapors in the off-gas, chamber 3a is purged with hot nitrogen gas to remove any remaining gases and vapors.

EXAMPLE 3

Where oily material 1a comprises certain amounts of solids, water, and at least three different hydrocarbons, for example light oil, heavy oil, and grease, the de-oiling process comprises at least three heating cycles. The first heating cycle is operated to raise the chamber temperature through the steam surge temperature range to the lowest effective temperature for vaporizing one of the hydrocarbons contained in the oily mixture as heretofore described above Example 2.

After the first heating cycle, condensate is separated into water and a first hydrocarbon product using condenser 16 and separator 17, chamber 3a is purged with hot nitrogen, and a second or next successive heating cycle step raises the chamber 3a temperature to a next higher effective temperature for vaporizing one the hydrocarbons contained in the oily mixture. In this example, the chamber temperature is raised to the predetermined boiling point temperature for the heavy oil, about 675° F. (357° C.). During the second heating cycle step, off-gas from reactor vessel 3 may be fed to an optional, or second condenser 12x. The condensate from the second condenser 12x is fed along line 16x to the second separator 17x where the condensate is separated into water and a heavy oil or at least a second hydrocarbon product. When the continuous emission monitor 9 indicates an absence of evolved oil vapors in the off-gas, chamber 3a is purged with hot nitrogen gas to remove any remaining heavy oil vapors. The de-oiling process may include multiple successive heating cycles between the first heating cycle and target temperature depending on the number of different hydrocarbons contained in the oily mixture.

A third or last heating cycle step elevated chamber temperature to a target temperature that corresponds with the last or highest predetermined boiling point temperature for the hydrocarbons contained in the oily material 1a, in this instance, the boiling point temperature for the exemplary grease, about 1050° F. (566° C.). During the last heating cycle, off-gas from reactor vessel 3 may be fed along either line 8 or line 11 to a last optional condenser 12y. Condensate from the last alternative condenser 12y is fed along line 16y to the last optional separator 17y where the condensate is separated into water and a grease, or last hydrocarbon product. When the continuous emission monitor 9 indicates an absence of evolved hydrocarbon vapors in the off-gas, chamber 3a is purged with hot nitrogen gas to remove any remaining gases and vapors.

It should be noted however, that in oily mixtures containing more than one hydrocarbon, the off-gas and condensate generated by the different hydrocarbons during the successive heating cycle steps may be processed in a single condenser and a single separator, for example condenser 16 and separator 17, without departing from the scope of the present invention. However, using the same condenser and separator during successive heating cycle steps may result in producing a blended hydrocarbon product that may require additional downstream refining.

After the last heating cycle step is completed, the dry, de-oiled solids are discharged from reactor vessel 3. The dried and de-oiled solids may be pyrophoric, and accordingly, the discharged solids are lightly sprayed with water 18 to prevent spontaneous combustion when the solid material is exposed to the air. Sodium silicate may be mixed with the water to facilitate binding the de-oiled solid particles and prevent dusting. In the present embodiment, where the solid product is recovered from an oil-bearing steelmaking mixture, and in particular, where the solid product is recovered from oily iron-bearing mill stand sludge, the de-oiled solids are further processed in a pelletizer 19. The de-oiled solids are combined with dust or particulate matter from the optional baghouse 10, and the pelletizing apparatus agglomerates the de-oiled solids into an iron-bearing material measuring about ¼ inch or less in size. Such revert materials are extremely valuable reverts for recycling back into the steelmaking process as a coolant in the basic oxygen furnace, or as a source of iron. They are also suitable for use as a raw material in non-steelmaking manufacturing operations. For example, de-oiled iron-bearing material is highly desired for use as a raw material in the manufacture of Portland cement.

EXAMPLE 4

An alternate to the above three examples for de-oiling a sludge or oily mixture includes a single continuous heating cycle that elevates the reactor vessel chamber through a range of effective temperature levels including a first effective temperature, at least one intermediate effective temperature, and a final target temperature at the end of the heat cycle. Referring again to FIG. 1, an amount of analyzed iron-bearing sludge 1a is placed in the reactor vessel chamber 3a, the reactor vessel is sealed, and the hot inert gas purge is fed into the sealed vessel chamber 3a through line 4 connected to the inert gas supply 5. The continuous heating step raises the chamber temperature to the first or lowest effective temperature, through at least one or a range of intermediate effective temperatures, to the target temperature. As chamber temperature is elevated toward the first effective temperature, the steam surge erupts through the stirred oily mixture 1a and frees any hydrocarbons clinging to the surfaces of the solid particles contained in the mixture. When the oily mixture is dehydrated, stirring is discontinued and chamber temperature elevates through the first, and each successive intermediate effective temperature causing different hydrocarbons in the oily mixture to vaporize. When target temperature is reached, the last remaining hydrocarbon in the oily mixture, having the highest predetermined boiling point temperature, is vaporized. During the single continuous heating cycle, and in response to a predetermined pressure or temperature level within sealed chamber 3a, valve 7 is operated either manually or automatically to discharge the hot gases, for example nitrogen, hydrocarbon vapors, and steam, from the vessel. The gases are discharged as a hot off-gas through gas line 8 either to the optional baghouse 10 and condenser 12, or directly to condenser 12. A continuous emissions monitor 9 samples the off-gas, and when the monitor shows a sudden fall to where virtually no hydrocarbon vapor is detected, the single continuous heating cycle is stopped and chamber 3a is purged with hot nitrogen gas to prevent a premature phase change before the remaining off-gas reaches condenser 12.

As mixture 1a is being de-oiled during the continuous heating cycle, the discharged off-gas is sent to the condenser 12 and recovered nitrogen is recycled back to the inert gas purge supply 5 through line 13. Hot water is discharged to cooling tower 14 through line 15, and the condensate is fed along line 16 to separator 17 where the condensate is separated into water and a blended hydrocarbon product. The collected hydrocarbon product may be refined into different hydrocarbon products using any suitable process known in the art. The discharged water from separator 17 and from cooling tower 14 are suitable for direct discharge to the environment, and the dry de-oiled solids in reactor vessel 3 are discharged from the reactor vessel for downstream processing into either pellets, briquettes, or nodules used as a steelmaking revert. The discharged dry de-oiled solids are also suitable for use as a raw material in non-steelmaking applications.

Test A:

An oily mixture, consisting essentially of by weight 80% water, 3% oil (a hydrocarbon mixture), and the balance iron and incidental impurities in the form of finely sized solid particles, was collected from a steelmaking wastewater stream for laboratory testing under conditions that simulate the above disclosed de-oiling steps of the present invention. The collected sample was analyzed to identify different hydrocarbons contained in the mixture and their respective boiling point temperatures. The test was conducted to determine the effectiveness of the de-oiling process with respect to reducing hydrocarbon concentrations in the de-oiled solid particles. Of primary interest was whether the de-oiled iron-bearing particles would meet EPA requirements for recycling back into a steelmaking process. A second consideration of the test was directed to the effectiveness in recovering hydrocarbon products during the de-oiling process.

Figure 2:
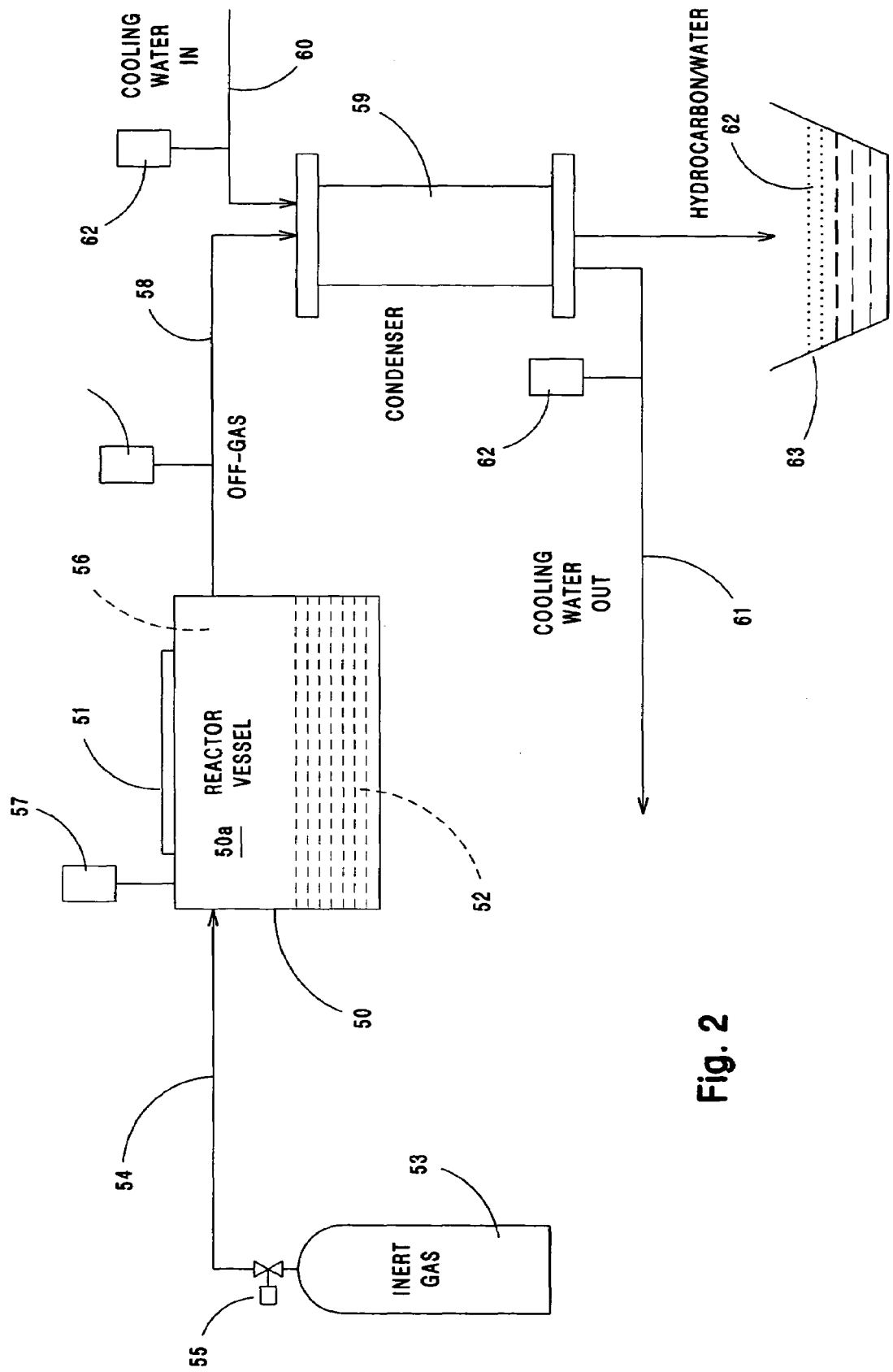
FIG. 2 illustrates test apparatus used to determine the efficiency of the present de-oiling process invention.

Referring to FIG. 2, an amount of the collected oily mixture 52 was placed in a test reactor vessel 50 that included a removable sealed lid 51 to provide access to the reaction chamber 50a. An inert gas supply 53, for instance nitrogen, was fed into chamber 50a as an inert gas purge through gas line 54. The inert gas purge was controlled with valve 55 to provide a regulated inert gas atmosphere 56 within the reaction chamber during the de-oiling process, the regulated inert gas atmosphere preventing ignition of the hydrocarbon vapors evolved during the de-oiling test.

The test reactor vessel was placed in a laboratory furnace that provided a heat source for elevating reaction chamber temperature in accordance with the above disclosed heat cycle steps, and a suitable thermocouple 57 was used to monitor chamber temperature during the test. The test off-gas, comprising nitrogen, steam, and hydrocarbon vapors was fed through gas line 58 to a water-cooled condenser or heat exchanger 59. Cooling water was fed to the condenser coil (not shown) through inlet line 60, and the heated water was discharged from the condenser along outlet line 61. The inlet and outlet lines were monitored with thermocouples 62 to improve heat exchange efficiency. The condensate from condenser 59 comprised a mixture of water and oil 62 collected in a catch beaker 63. Thermocouple 57 showed a maximum process temperature, or target temperature, of 923° F. (495° C.) was reached during the de-oiling test. The condensate was visually observed, and the test was completed in response to a reduced flow of condensate flow from condenser 59. It should be noted, however, that in a preferred embodiment, the off-gas would be monitored using a CEM and shown at reference number 9 in FIG. 1 to determine when the de-oiling process is completed.

The test apparatus did not include the separator 17 shown in FIG. 1 to separate water from the hydrocarbon product(s). However, during the test, different hydrocarbon/water mixtures were collected in individual collection beakers as chamber temperature elevated through the temperature range to target temperature. The test procedure also did not include recycling the nitrogen purge back to the gas supply. The nitrogen was simply exhausted to a gas hood.

As mentioned before, the primary concern of the test was to determine the amount of oil remaining in the de-oiled solid particles, and also determine whether the de-oiled iron-bearing particles were suitable for recycling as a steelmaking revert under EPA regulations. An independent analysis of the de-oiled particles indicated that they consisted of essentially 73.1% $Fe_2O_3$ and incidental impurities, and 0.037% oil or 370 ppm. Such unexpected de-oiling results are far below the EPA requirement of 2,500 ppm oil for recycling reverts back into a steelmaking operation.

Test B:

An oily mixture, consisting essentially of by weight 5% water, 10% oil (a hydrocarbon mixture), and the balance iron and incidental impurities in the form of oil caked finely sized solid particles, was collected from a hot strip mill (HSM) for testing under the same laboratory conditions in Example A. The sample was analyzed to determine the hydrocarbons present in the mixture as before. The HSM oily mixture was de-oiled in an inert gas atmosphere in test reactor vessel 50 as described above, and the heating cycle raised the reactor vessel chamber temperature to a maximum or target temperature of 1,087° F. (486° C.) before the de-oiling test was discontinued by observing the condensate flow from condenser 59.

Again, the primary concern of this test was to determine the amount of oil remaining in the de-oiled iron-bearing solid particles, and to determine whether the de-oiled solids were suitable for recycling as a steelmaking revert under EPA regulations. The same independent analysis indicated that the de-oiled solids collected from this test consisted essentially of 96.7% $Fe_2O_3$ and incidental impurities, and 0.011% oil or about 100 ppm.

These even better unexpected test results, as compared to Test A, greatly exceeds the EPA 2,500 ppm oil requirement for recycling iron-bearing reverts back into a steelmaking operation. In view of the Test A and Test B results, the present invention provides a valuable de-oiled iron source for steelmaking operations that was heretofore not available to the industry.

Figure 3:
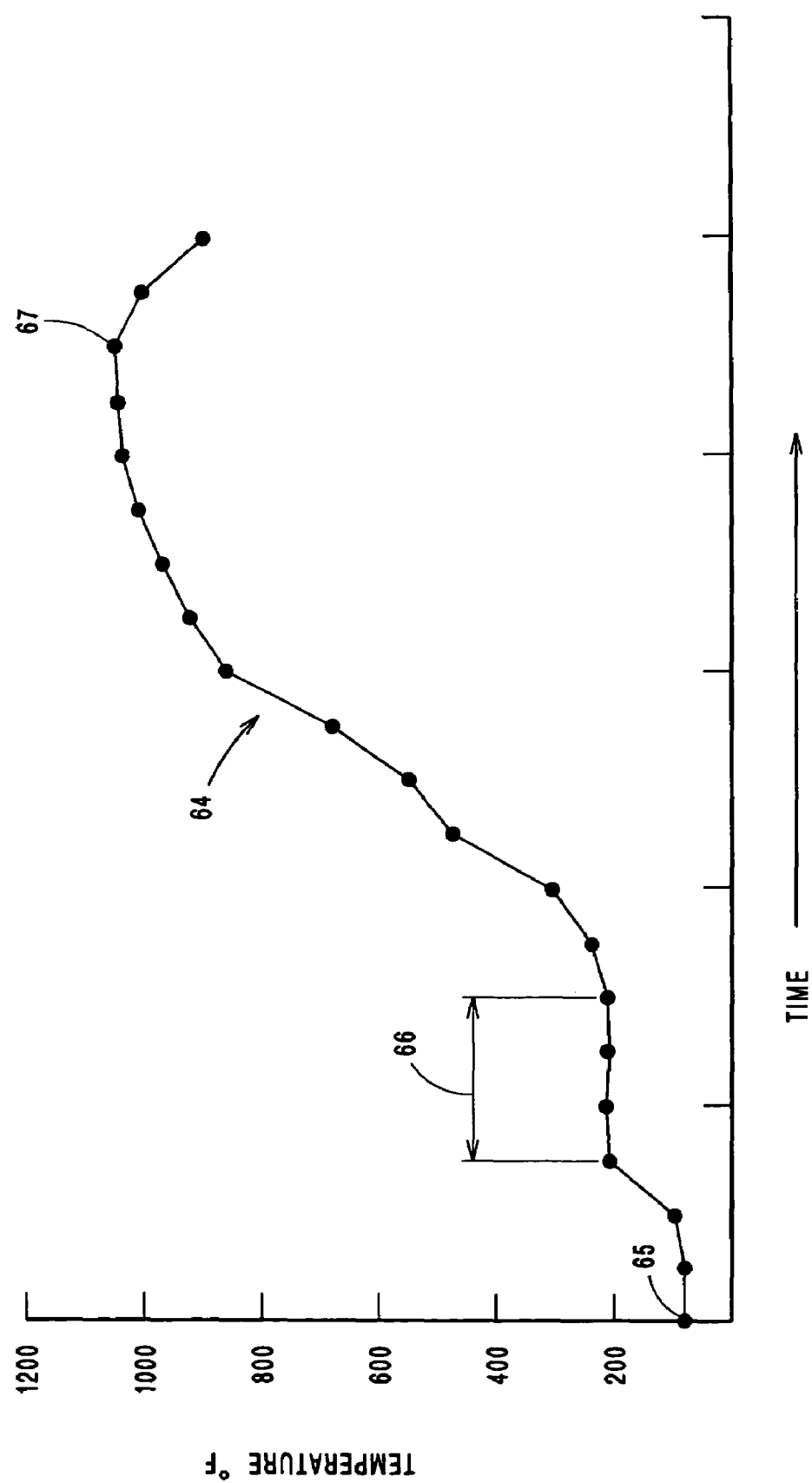
FIG. 3 is a graph plotted from test data showing de-oiling as a function of temperature.
Figure 4:
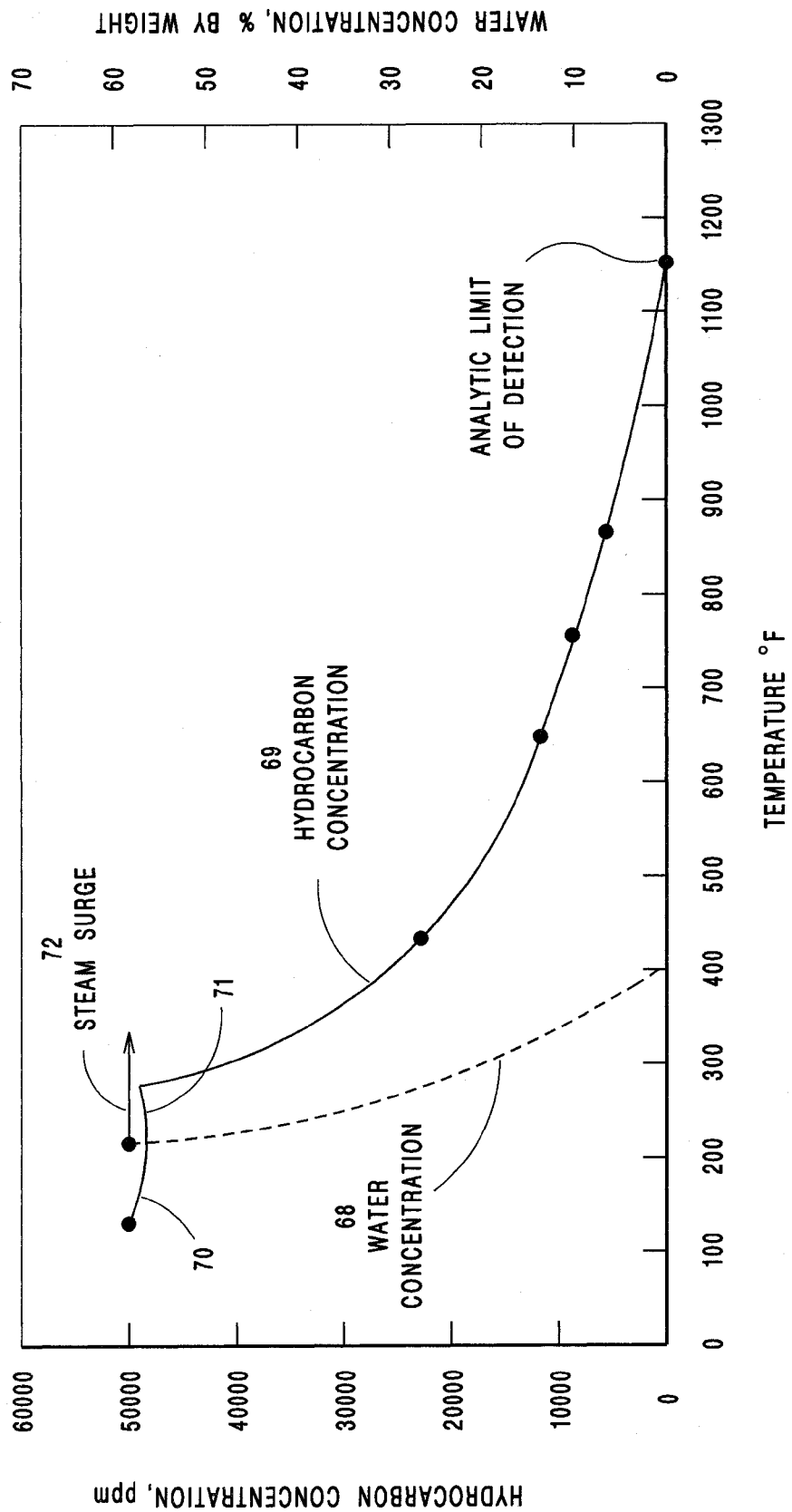
FIG. 4 is a graph plotted from test data showing water and hydrocarbon reduction levels with respect to the temperature levels plotted in FIG. 3.

FIG. 3 shows a typical thermal profile, and FIG. 4 shows hydrocarbon and water concentration levels based on data recorded during testing. Referring specifically to FIG. 3, the typical thermal profile 64 is plotted from the test reactor vessel thermocouple readings as shown in FIG. 3. The plotted data confirms that the de-oiling is a function of temperature and time. Depending on resident chamber temperature, the entire process can take between about 15 to 30 minutes to de-oil the solid particles contained in an oily mixture. For example, a cold vessel will require a longer heat cycle than a vessel that has been preheated by earlier use heat cycles.

At the start of the process 65, a cold vessel chamber temperature is at or near ambient temperature. An oily test batch sample is placed in the reactor vessel chamber, the chamber is sealed, and the sealed chamber is purged with nitrogen to provide the necessary inert gas atmosphere that prevents ignition during the heating cycle step. A suitable heat source is used to raise chamber temperature toward the predetermined target temperature necessary for completing the de-oiling process. When the elevated chamber temperature reaches a first temperature 66, about the boiling point of water 66, the chamber temperature remains somewhat constant for a period of time while the water in the mixture, about 10% or more by weight, is converted into the steam surge that erupts through the oily mixture to free hydrocarbons clinging to the surfaces of the iron-bearing solid particles. After the oily mixture is dehydrated, the temperature begins to rise toward the second or predetermined target temperature 67. As chamber temperature moves through the two step or multiple step temperature range, from water vaporization to the maximum target temperature, different hydrocarbons will begin to vaporize at intermediate temperature elevations depending on the particular composition of the oily mixture. In actual practice, the evolved vapors are condensed and processed into hydrocarbon products as described in any of the above embodiments. When the chamber temperature reaches the predetermined target temperature 67, for example 1,052° F. (567° C.), and after the OEM shown in FIG. 1 indicates there are no remaining hydrocarbon vapors in the reactor vessel, the heating cycle is stopped and the reactor vessel is purged with nitrogen in preparation to receive a next batch for de-oiling.

FIG. 4 shows the reduction in water 68 and the reduction in hydrocarbon 69 as related to the temperature range shown in FIG. 3. As the temperature within the sealed test chamber rises to 212° F., (100° C.) a small amount of the hydrocarbon is initially vaporized 70. As the chamber temperature rises above 212° F. (100° C.), the hydrocarbon concentration in the oily mixture may increase slightly 71 due to the water in the mixture being converted into the steam surge that erupts through the oily mixture to free hydrocarbons clinging to the iron-bearing solid particles. The water concentration plummets to zero while different hydrocarbons contained in the mixture are vaporized in response to increasing chamber temperature. When chamber temperature reaches the predetermined target temperature, in this example 1,052° F. (567° C.), the hydrocarbon concentration in oily mixture falls to a virtually undetectable level, between about 100 to 400 ppm, leaving behind a valuable de-oiled and de-watered iron-bearing revert suitable for recycling back into a steelmaking operation.

Although the present invention is disclosed in terms as being particularly useful for de-oiling steelmaking sludges, wastewater streams, and the like, it should be understood that the present invention is not limited to use in the steelmaking industry. The de-oiling process of the present invention is global in that the process may be used to de-oil and separate into its various components any industrial, municipal, or environmental oily waste or spill without departing from the scope of the present invention.

As such, the present invention has been disclosed in terms of preferred and alternate embodiments that fulfill each one of the objects set forth above, and the invention provides a new and improved method for de-oiling oily materials and separating the various components of the oily material into useful products. Of course, those skilled in the art may contemplate various changes, modifications, and alterations from the teachings of the present disclosure without departing from the intended spirit and scope of the present invention.

I claim:

1. A process for recycling iron in steelmaking sludge, the steps comprising:
    placing sludge in a reactor chamber, the sludge comprising between about 2% to about 15% variform hydrocarbon matter, at least 5% water, and the remainder iron-bearing solids measuring 100 mesh or smaller;
    supplying the reactor chamber with an inert gas;
    elevating the reactor chamber to a first temperature, and maintaining the reactor at the first temperature for a period sufficient to cause at least a substantial portion of the water in the sludge to erupt from within the sludge as steam, the erupting steam reducing water content so that the atmosphere within the reaction chamber consists essentially of inert gas and water vapor:

thereafter elevating the reactor chamber to a second temperature higher than the first temperature, the second temperature vaporizing the variform hydrocarbon matter within the sludge and de-oiling the solids so that the atmosphere within the reactor chamber is an off-gas that consists essentially of inert gas and hydrocarbons venting the off-gas from the reaction chamber for downstream processing; and discharging de-oiled iron-bearing solid particles from the reactor chamber for downstream processing.

2. The process recited in claim 1 wherein the de-oiled iron-bearing solid particles are discharged for downstream processing in response to an absence of hydrocarbon vapors in said off-gas vented from said reactor chamber.

3. The process recited in claim 1 further comprising stirring the sludge during a portion of the temperature elevating steps.

4. The process recited in claim 1 further comprising;
analyzing the sludge to identify at least one hydrocarbon contained therein;
elevating the reactor chamber to a second temperature that vaporizes the identified hydrocarbon; and
venting the off-gas that consists essentially of inert gas and the vaporized hydrocarbon.

5. The process recited in claim 4 whereby; after the step analyzing the sludge:
elevating the reactor chamber to at least one intermediate temperature between the first and the second temperature that vaporizes an identified hydrocarbon having an intermediate boiling point and venting the off-gas that consists essentially of inert gas and the vaporized hydrocarbon, and;
elevating the reactor chamber to a last temperature that vaporizes an identified hydrocarbon having a highest boiling point and venting the off-gas that consists essentially of inert gas and the vaporized hydrocarbon.

6. The process recited in claim 4 further comprising:
separating the vented off-gas into a at least one hydrocarbon product.

7. The process recited in claim 5 further comprising:
separating the vented hydrocarbon vapors into a at least two hydrocarbon products.

8. The process recited in claim 5 wherein the last temperature is greater than about 1,000 degrees F.

9. The process recited in claim 1 wherein said inert atmosphere is nitrogen and the process further comprises venting and recycling said nitrogen back into the de-oiling process.

10. The process recited in claim 1 wherein said discharged iron-bearing solid particles comprise iron oxides having a hydrocarbon concentration reduced to a level suitable for recycling back into a steelmaking vessel.

11. The process recited in claim 1, wherein the second temperature is greater than about 1,000 degrees F.

12. A process for making a steelmaking revert comprising:
containing steelmaking waste within an inert atmosphere, said steelmaking waste comprising a sludge having between about 2% to about 15% viscid hydrocarbons, water, and iron-bearing solids measuring 100 mesh or smaller, said iron-bearing solids caked with the viscid hydrocarbons;
heating the steelmaking waste to a first temperature that generates a steam surge maintaining the waste at the first temperature for a period sufficient to allow the steam surge to reduce the water content of the sludge the steam surge freeing the caked viscid hydrocarbons from the iron-bearing solid particles; and
thereafter continuing to heat the steelmaking waste to a second temperature that vaporizes the viscid hydrocarbons whereby said iron-bearing solid particles are de-oiled for recycling as a steelmaking revert.

13. The process recited in claim 12 further comprising:
containing the steelmaking waste in a sealed chamber for attached to an inert gas feed and an off-gas vent;
adjusting the inert gas feed to provide an inert atmosphere within the sealed chamber;
stirring the steelmaking waste during at least a portion of the heating steps;
adjusting the off-gas vent to purge the sealed chamber; and
discharging de-oiled iron-bearing solids from the sealed chamber for downstream processing and/or recycling as a steelmaking revert.

14. The process recited in claim 13 further comprising:
condensing the purged off-gas to recover inert gas recycled back to the inert gas feed, and a condensate separated into water and at least one hydrocarbon product.

15. The process recited in claim 14 further comprising:
separating the condensate into water and at least two different hydrocarbon products.

16. The process recited in claim 13 further comprising:
feeding said purged off-gas to at least two condensers, each condenser recovering and recycling purged inert gas back to the inert gas feed, each condenser discharging a condensate, and
separating each condensate into water and a hydrocarbon product.

17. The process recited in claim 14 further comprising:
filtering the purged off-gas and feeding the filtered off-gas to the condenser.

18. The process recited in claim 16 further comprising:
filtering the purged off-gas and feeding the filtered off-gas to at least two condensers.

19. The process recited in claim 13 further comprising:
analyzing the steelmaking waste and identifying at least one hydrocarbon contained therein; and
elevating the sealed chamber to a second temperature that vaporizes the identified hydrocarbon and venting off-gas that consists essentially of inert gas and the vaporized hydrocarbon.

20. The process recited in claim 19, whereby; after the step analyzing the steelmaking waste:
elevating the reactor chamber to at least one intermediate temperature between the first and the second temperature, the intermediate temperature vaporizing an identified hydrocarbon having an intermediate boiling point and venting off-gas that consists essentially of inert gas and the vaporized hydrocarbon, and;
elevating the reactor chamber to a last temperature that vaporizes an identified hydrocarbon having a highest boiling point and venting off-gas that consists essentially of inert gas and the vaporized hydrocarbon.

21. The process recited in claim 12 wherein; said iron-bearing solid particles are discharged as a de-oiled steelmaking revert consisting essentially of; iron oxides in an amount greater than about 30,000 ppm; and hydrocarbon matter in an amount less than about 2,500 ppm.

22. A process for de-oiling solid particles contained in a sludge consisting essentially of between about 2% and about 20% variform hydrocarbon matter, water, and solid particles measuring 100 mesh or smaller being de-oiled, oiled, the steps of the process comprising:
placing the sludge in a reactor chamber;
providing an inert atmosphere within the reactor chamber;
causing at least a portion of the water to erupt as a steam surge within the sludge and within the reactor chamber during a first heating step, the erupting steam surge reducing water content during the first heating step, the erupting steam surge freeing hydrocarbon matter clinging to surfaces of the solid particles being de-oiled;

vaporizing the hydrocarbon matter contained in the sludge and within the reactor chamber during a second heating step;

venting off-gas from the reaction chamber for downstream processing, the off-gas consisting essentially of hydrocarbon vapors, inert gas, and steam; and discharging de-oiled solid particles from the reactor chamber for disposal, processing or recycling.

23. The process recited in claim 22 wherein said de-oiled solid particles are discharged in response to an absence of hydrocarbon vapors detected in said off-gas.

24. The process recited in claim 22 further comprising: stirring the sludge during the step causing water to erupt as a steam surge.

25. The process recited in claim 22 further comprising:
analyzing the sludge to identify at least one hydrocarbon matter contained therein; and elevating the reactor chamber to a temperature that vaporizes an identified hydrocarbon and venting off-gas that consists essentially of inert gas and the vaporized hydrocarbon.

26. The process recited in claim 25 whereby; after the step analyzing the sludge:

elevating the reactor chamber to at least one intermediate temperature between the first and the second heating steps, the intermediate temperature vaporizing an identified hydrocarbon having an intermediate boiling point and venting off-gas that consists essentially of inert gas and the vaporized hydrocarbon; and elevating the reactor chamber to a last temperature that vaporizes an identified hydrocarbon having a highest boiling point and venting off-gas that consists essentially of inert gas and the vaporized hydrocarbon.

27. The process recited in claim 25 further comprising: separating the vented off-gas into at least one hydrocarbon product.

28. The process recited in claim 26 further comprising: separating the vented off-gas into at least two hydrocarbon products.

29. The process recited in claim 22 wherein the inert atmosphere is nitrogen.

30. The process recited in claim 22 wherein the sludge is an industrial waste material.

31. The process recited in claim 22 wherein the sludge is a municipal waste material.

32. The process recited in claim 22 wherein the sludge is steelmaking waste.

* * * * *